United States Patent
Hong et al.

(10) Patent No.: US 12,158,727 B2
(45) Date of Patent: Dec. 3, 2024

(54) HOLOGRAM COLOR PRINTING METHOD AND APPARATUS USING HOLOGRAM MEDIUM LIGHT EFFICIENCY MAP

(71) Applicant: Korea Electronics Technology Institute, Seongnam-si (KR)

(72) Inventors: Sung Hee Hong, Seoul (KR); Young Min Kim, Seoul (KR); Ji Soo Hong, Seoul (KR); Jin Soo Jeong, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 542 days.

(21) Appl. No.: 17/621,890

(22) PCT Filed: Dec. 2, 2020

(86) PCT No.: PCT/KR2020/017425
§ 371 (c)(1),
(2) Date: Dec. 22, 2021

(87) PCT Pub. No.: WO2022/118997
PCT Pub. Date: Jun. 9, 2022

(65) Prior Publication Data
US 2022/0365483 A1    Nov. 17, 2022

(30) Foreign Application Priority Data
Dec. 2, 2020 (KR) .......................... 10-2020-0166175

(51) Int. Cl.
*G03H 1/04* (2006.01)
(52) U.S. Cl.
CPC ............. *G03H 1/0476* (2013.01); *G03H 1/04* (2013.01)

(58) Field of Classification Search
None
See application file for complete search history.

(56) References Cited

U.S. PATENT DOCUMENTS

| | | | |
|---|---|---|---|
| 11,747,766 B2* | 9/2023 | Huang | G02B 27/0172 359/9 |
| 2009/0273662 A1* | 11/2009 | Lucente | G03H 1/08 348/E13.001 |
| 2012/0256334 A1 | 10/2012 | Yoshinari et al. | |

FOREIGN PATENT DOCUMENTS

| JP | 2006-243241 A | 9/2006 |
|---|---|---|
| JP | 2012-220690 A | 11/2012 |

OTHER PUBLICATIONS

Korean Office Action issued on Jun. 20, 2023, in corresponding Korean Patent Application No. 10-2020-0166175 (3 pages in English, 5 pages in Korean).

* cited by examiner

*Primary Examiner* — Jennifer D. Carruth
(74) *Attorney, Agent, or Firm* — NSIP Law

(57) ABSTRACT

Provided is a hologram printing method and apparatus using a hologram medium light efficiency map. A hologram printing method according to an embodiment emits a laser to a hologram medium, acquires an image by photographing light diffracted from the hologram medium, generates a light efficiency map of the hologram medium from the acquired image, and records hogels on the hologram medium by referring to the generated light efficiency maps of the hologram medium. Accordingly, light efficiency is measured on each hogel area, and hologram printing is performed by adjusting an intensity of a laser of each wavelength according to a hogel, so that uniformity of luminance and color of a hologram printing result can be enhanced.

8 Claims, 6 Drawing Sheets

HOLOGRAM COLOR PRINTING METHOD AND APPARATUS USING HOLOGRAM MEDIUM LIGHT EFFICIENCY MAP

CROSS REFERENCE TO RELATED APPLICATIONS

This application is a U.S. National Stage Application of International Application No. PCT/KR2020/017425, filed on Dec. 2, 2020, which claims the benefit under 35 USC 119(a) and 365 (b) of Korean Patent Application No. 10-2020-0166175, filed on Dec. 2, 2020, in the Korean Intellectual Property Office, the entire disclosure of which is incorporated herein by reference for all purposes.

TECHNICAL FIELD

The present disclosure relates to hologram-related technology, and more particularly, to a method and an apparatus for printing a hologram, which record a hologram on a hologram medium on a holographic element (hogel) basis.

BACKGROUND ART

Hologram media used in hologram printers do not still provide a high degree of precision in view of efficiency. This is because hologram media (silver halide, photopolymer, etc.) are not popularized and are produced in small quantities and their factory automation is not achieved, and quality of a hologram medium depends on a manufacturing time and a manufacturing environment.

When overall recording efficiency of a real hologram medium is measured as shown in FIG. 1, luminance corresponding to respective hogel areas is not uniform and is measured differently due to the above-described reasons, as shown in FIG. 2.

Accordingly, there is a demand for a method for enhancing image quality of hologram printing when uniformity of efficiency of a medium is not good, and enhancing uniformity of efficiency.

DISCLOSURE

Technical Problem

The present disclosure has been developed in order to address the above-discussed deficiencies of the prior art, and an object of the present disclosure is to provide a method and an apparatus for hologram color printing by using a hologram medium light efficiency map, which perform hologram printing by adjusting an intensity of a laser of each wavelength on a hogel basis by measuring light efficiency on each hogel area, as a solution for enhancing uniformity of luminance and color of a result of hologram printing.

Technical Solution

According to an embodiment of the present disclosure to achieve the above-described object, a hologram printing method includes the steps of: emitting a laser to a hologram medium; acquiring an image by photographing light diffracted from the hologram medium; generating a light efficiency map of the hologram medium from the acquired image; and recording hogels on the hologram medium by referring to the generated light efficiency maps of the hologram medium.

According to an embodiment of the present disclosure, the hologram printing method may further include a step of converting the acquired image into a mono image, and the step of generating may include generating the light efficiency map of the hologram medium from the converted mono image.

According to an embodiment of the present disclosure, the hologram printing method may further include a step of dividing the converted mono image on a hogel basis, and the step of generating may include generating the light efficiency map of the hologram medium by digitizing luminance on each of the divided hogels.

The step of emitting may include emitting a laser of a specific wavelength to the hologram medium.

The step of recording may include recording the hogels on the hologram medium while adjusting an intensity of a light source for recording on the hogel basis, by referring to the generated light efficiency maps of the hologram medium.

The step of emitting, the step of acquiring, and the step of generating may be performed with respect to a plurality of laser wavelengths.

The step of recording may include recording the hogels on the hologram medium while adjusting an intensity of a light source for recording on the basis of a wavelength and on the basis of a hogel, by referring to the generated efficiency maps of the hologram medium.

According to another embodiment of the present disclosure, a hologram printing apparatus includes: a light source configured to emit a laser to a hologram medium; a camera configured to acquire an image by photographing light diffracted from the hologram medium; a generator configured to generate a light efficiency map of the hologram medium from the acquired image; and a recording unit configured to record hogels on the hologram medium by referring to the generated light efficiency maps of the hologram medium.

Advantageous Effects

According to embodiments of the present disclosure as described above, light efficiency is measured on each hogel area, and hologram printing is performed by adjusting an intensity of a laser of each wavelength according to a hogel, so that uniformity of luminance and color of a hologram printing result can be enhanced.

In particular, according to embodiments of the present disclosure, problems of related-art hologram printing methods that it is difficult to implement exact color and luminance, it is difficult to implement natural colors, and hologram image quality is degraded like a noise can be mitigated.

BEST MODE

Hereinafter, the present disclosure will be described in more detail with reference to the drawings.

Embodiments of the present disclosure provide a hologram color printing method and apparatus using a hologram medium light efficiency map.

In an embodiment of the present disclosure, uniformity of luminance is maximized by adjusting an intensity of a laser of each wavelength differently according to an area of a medium, by applying different light efficiency according to an area of each hogel.

Figure 1:
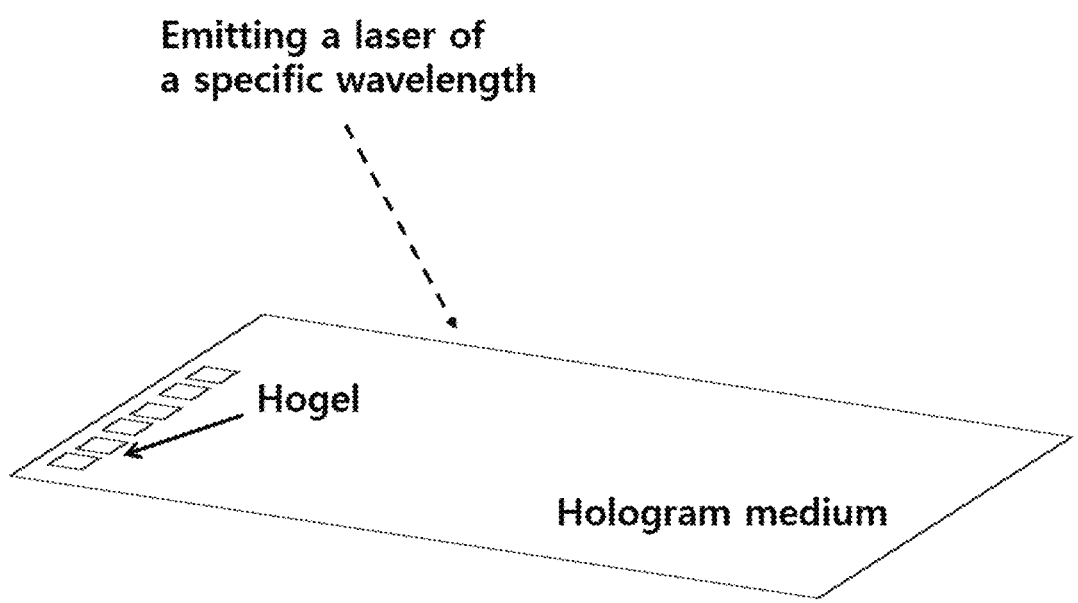
FIG. 1 is a view illustrating a method of measuring overall recording efficiency of a related-art hologram medium.
Figure 2:
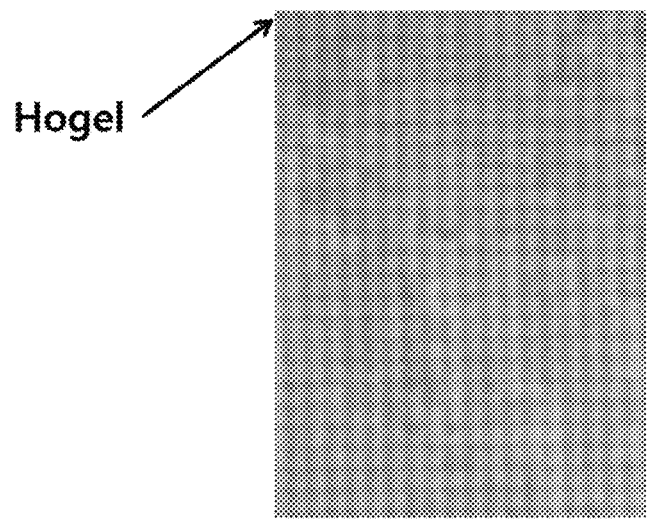
FIG. 2 is a view illustrating a result of measuring the overall recording efficiency of the related-art hologram medium.
Figure 3:
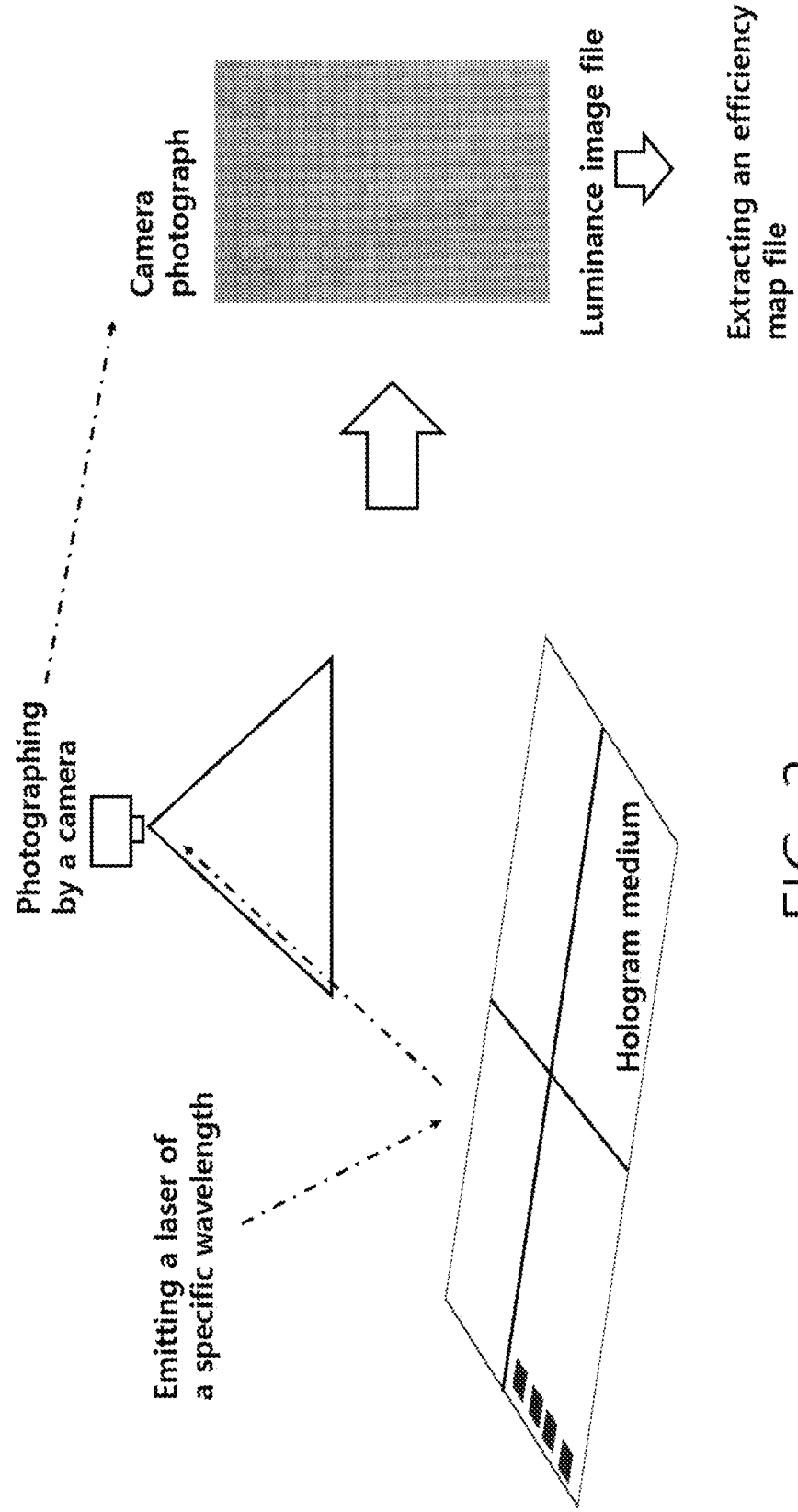
FIG. 3 is a view illustrating a light efficiency map measurement method of a hologram medium suggested in an embodiment of the present disclosure.

Specifically, as shown in FIG. 3, an image file is generated by emitting a specific laser wavelength to a hologram medium from a light source, and photographing light diffracted therefrom with a camera. Herein, the generated image file may be an entirely ununiform image file that is sparsely holed.

Accordingly, when the image file is changed to a mono image and luminance is digitized, efficiency regarding each area may be digitized. Based on this, a light efficiency map of the hologram medium may be made. When hologram printing is performed, a more uniform, more exact color can be implemented by adjusting a power value of a laser of each wavelength on each hogel and recording.

Figure 4:
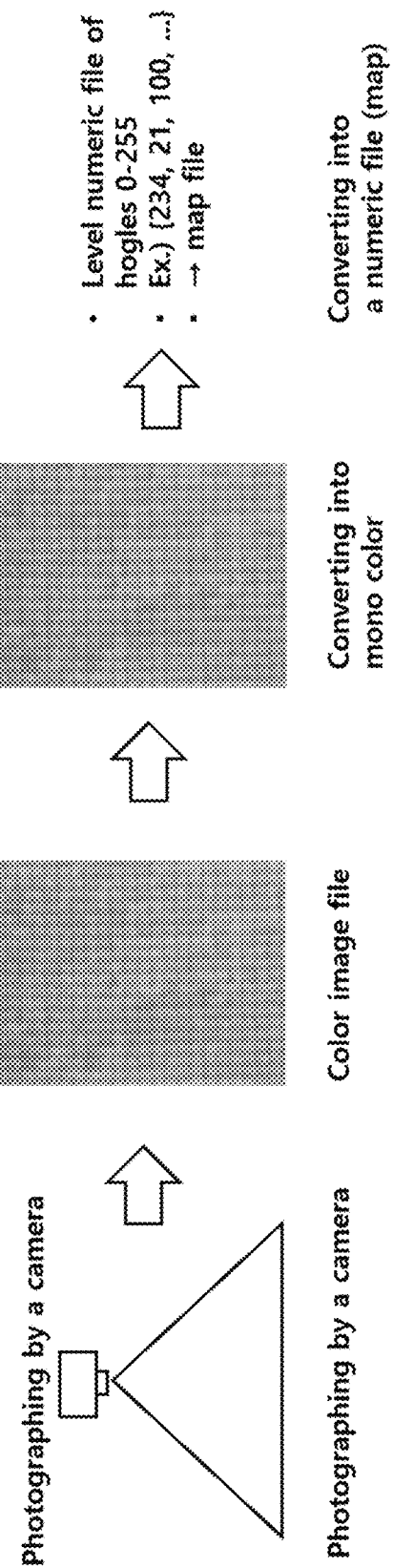
FIG. 4 is a view illustrating a process of generating a light efficiency map.

FIG. 4 illustrates a sequence of a process of generating a light efficiency map of a hologram medium.

Figure 5:
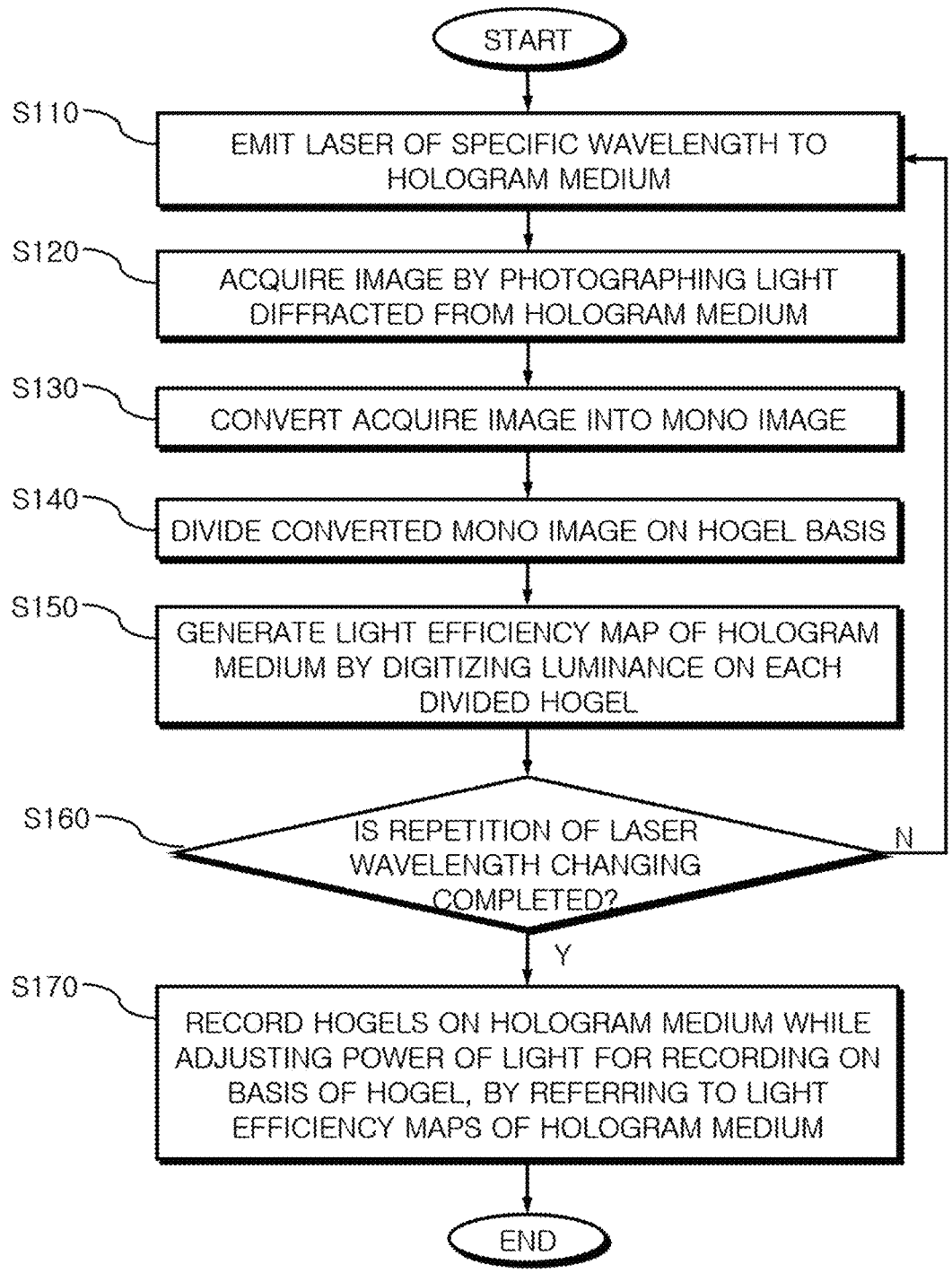
FIG. 5 is a flowchart provided to explain a hologram printing method according to an embodiment of the present disclosure.

FIG. 5 is a flowchart provided to explain a hologram printing method according to an embodiment of the present disclosure. The hologram printing method illustrated includes a process of generating a light efficiency map of a hologram medium which is referred for hologram printing, and a process of recording a hologram on the hologram medium by using the light efficiency map.

In order to generate a light efficiency map, a laser of a specific wavelength is emitted to the hologram medium (S110), and an image is acquired by photographing light diffracted from the hologram medium (S120).

Next, the image acquired at step S120 is converted into a mono image (S130), and the converted mono image is divided on a hogel basis (S140).

In addition, a light efficiency map of the hologram medium may be generated by digitizing luminance on each hogel divided at step S140 (S150).

Light efficiency maps of the hologram medium for respective laser wavelengths are generated by repeating steps S110 to S140 while changing the wavelength of the laser (S160).

Accordingly, the light efficiency maps of the hologram medium for various wavelengths are generated. That is, a light efficiency map of the hologram medium for a red laser, a light efficiency map of the hologram medium for a green laser, and a light efficiency map of the hologram medium for a blue laser are generated, respectively.

Thereafter, hogels are recorded on the hologram medium with reference to the light efficiency maps of the hologram generated at step S150 (S170). In this process, power of recording light to be emitted to the hologram medium is adjusted on a wavelength basis as well as on a hogel basis, with reference to the light efficiency maps of the hologram medium.

That is, power of light which is used for recording is adjusted on the basis of a light waveform and is adjusted on the basis of hogel, with reference to the light efficiency maps of the hologram medium generated for the respective laser wavelengths. Accordingly, light is emitted from the light source with power being adjusted differently according to a hogel, and the power of the light source may also be adjusted differently according to a wavelength.

Figure 6:
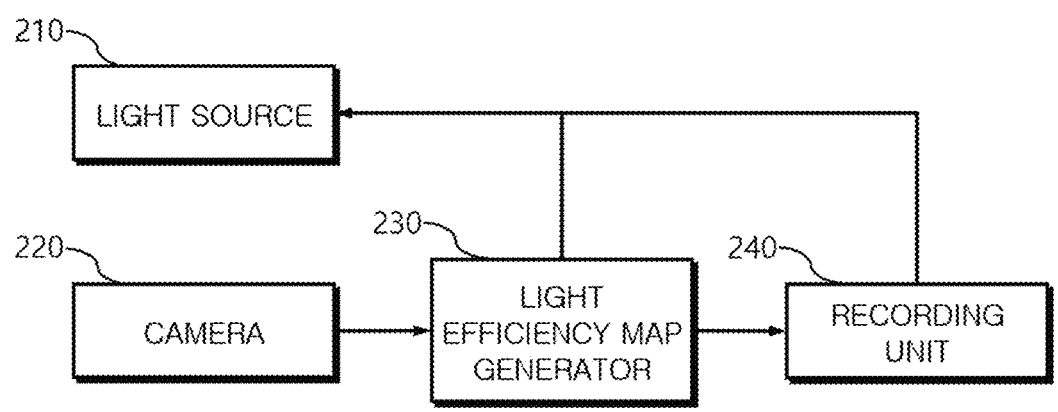
FIG. 6 is a block diagram of a hologram printing apparatus according to another embodiment of the present disclosure.

FIG. 6 is a block diagram of a hologram printing apparatus according to another embodiment of the present disclosure. The hologram printing apparatus according to an embodiment of the present disclosure includes a light source 210, a camera 220, a light efficiency map generator 230, and a recording unit 240 as shown in the drawing.

When a laser of a specific wavelength is emitted to a hologram medium from the light source 210, the camera 220 acquires an image by photographing light diffracted from the hologram medium.

The light efficiency map generator 230 converts the image acquired by the camera 220 into a mono image, and divides the converted mono image on a hogel basis. Then, the light efficiency map generator 230 generates a light efficiency map of the hologram medium by digitizing luminance on the basis of the divided hogel.

Thereafter, the light efficiency map generator 230 generates light efficiency maps of the hologram medium for respective laser wavelengths, while changing wavelengths of the lasers emitted from the light source 210.

The recording unit 240 records hogels on the hologram medium with reference to the light efficiency maps of the hologram medium generated by the light efficiency map generator 230. In this process, the recording unit 240 adjusts power of the light source 210, which will emit light for recording on the hologram medium based on the light efficiency maps of the hologram medium, on the hogel basis and on the wavelength basis.

For example, on the first hogel, an intensity of a red laser may be adjusted to I1, an intensity of a green laser may be adjusted to I2, and an intensity of a blue laser may be adjusted to I3, and on the second hogel, the intensity of the red laser may be adjusted to I1, the intensity of the green laser may be adjusted to I4, and the intensity of the blue laser may be adjusted to I5.

Up to now, the hologram color printing method and apparatus using the hologram medium light efficiency map have been described with reference to preferred embodiments.

In embodiments of the present disclosure, efficiency of each wavelength is measured on each hogel area, and hologram printing is performed by emitting a laser of a wavelength of a different intensity every time recording is performed, so that uniformity of luminance and color of a hologram printing result can be exactly implemented.

Through this method, uniform luminance and color balancing can be achieved, and, when hologram printing is performed, a more exact color can be implemented. Accordingly, deteriorated color reproduction, degradation of hologram image quality such as a noise, which appear in related-art hologram printing methods, can be solved.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A hologram printing method comprising the steps of:
    emitting a laser to a hologram medium;
    acquiring an image by photographing light diffracted from the hologram medium;
    generating a light efficiency map of the hologram medium from the acquired image; and
    recording hogels on the hologram medium by referring to the generated light efficiency maps of the hologram medium.

2. The hologram printing method of claim 1, further comprising a step of converting the acquired image into a mono image,
    wherein the step of generating comprises generating the light efficiency map of the hologram medium from the converted mono image.

3. The hologram printing method of claim 2, further comprising a step of dividing the converted mono image on a hogel basis,
    wherein the step of generating comprises generating the light efficiency map of the hologram medium by digitizing luminance on each of the divided hogels.

4. The hologram printing method of claim 3, wherein the step of emitting comprises emitting a laser of a specific wavelength to the hologram medium.

5. The hologram printing method of claim 4, wherein the step of recording comprises recording the hogels on the hologram medium while adjusting an intensity of a light source for recording on the hogel basis, by referring to the generated light efficiency maps of the hologram medium.

6. The hologram printing method of claim 4, wherein the step of emitting, the step of acquiring, and the step of generating are performed with respect to a plurality of laser wavelengths.

7. The hologram printing method of claim 6, wherein the step of recording comprises recording the hogels on the hologram medium while adjusting an intensity of a light source for recording on the basis of a wavelength and on the basis of a hogel, by referring to the generated efficiency maps of the hologram medium.

8. A hologram printing apparatus comprising:
    a light source configured to emit a laser to a hologram medium;
    a camera configured to acquire an image by photographing light diffracted from the hologram medium;
    a generator configured to generate a light efficiency map of the hologram medium from the acquired image; and
    a recording unit configured to record hogels on the hologram medium by referring to the generated light efficiency maps of the hologram medium.

* * * * *